Dec. 23, 1941.  R. A. IRELAND  2,267,103
HEAD SUPPORT
Filed Dec. 4, 1940  2 Sheets-Sheet 1
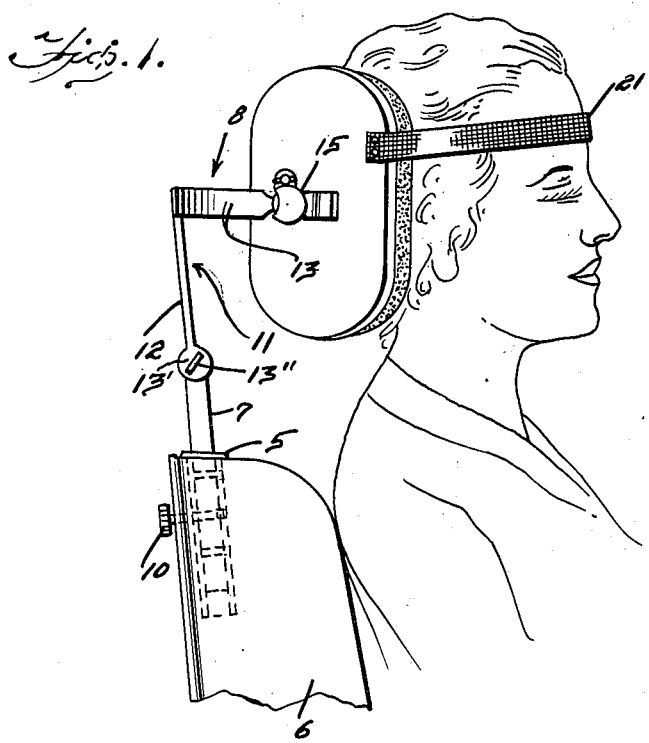
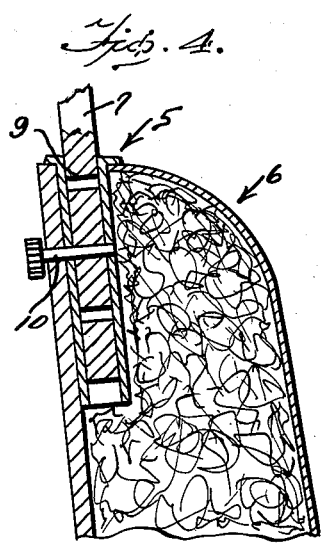
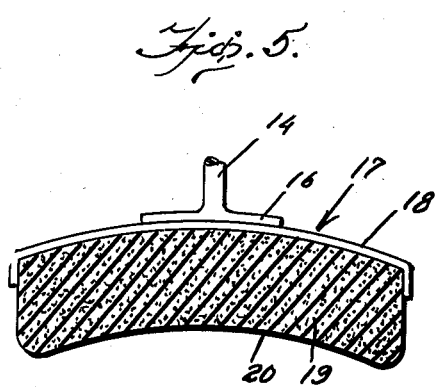
Inventor
Ritchie A. Ireland
By Clarence A. O'Brien
Attorney Dec. 23, 1941.     R. A. IRELAND     2,267,103
HEAD SUPPORT
Filed Dec. 4, 1940     2 Sheets-Sheet 2

Inventor
Ritchie A. Ireland
By Clarence A. O'Brien
Attorney

Patented Dec. 23, 1941

2,267,103

UNITED STATES PATENT OFFICE 2,267,103

HEAD SUPPORT

Ritchie A. Ireland, Charleston, W. Va.

Application December 4, 1940, Serial No. 368,545

3 Claims. (Cl. 155—177)

This invention relates to head supports for various types of vehicles employed for the transportation of persons and especially adaptable for use by persons who are traveling for long distances and desire to relax and rest.

The primary object of this invention is the provision of a device of this character which will comfortably support a person's head to relieve fatigue and also will provide a safety medium to obviate injury to the neck or other parts of the anatomy caused by sudden jerks of the head occasioned by sudden stops of the vehicle or an accident between the vehicle and another vehicle or an obstruction of some kind.

Another object of this invention is the provision of a device of the above stated character which may be readily adapted to a back rest of a seat or chair of a vehicle and easily removed when not desired and stored in a comparatively small space and which will provide a soft comfortable rest for the head capable of yielding to absorb shock and may be readily adjusted to suit the requirements of each individual desiring the use thereof.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a side elevation illustrating a head support and showing the application thereof to the back of a chair or seat of a vehicle and supporting a person's head.

Figure 4 is a fragmentary sectional view showing the means of detachably connecting the rest to the back of the seat.

Figure 5 is a detail sectional view illustrating one of the head cushion or pillow elements.

Figure 2:
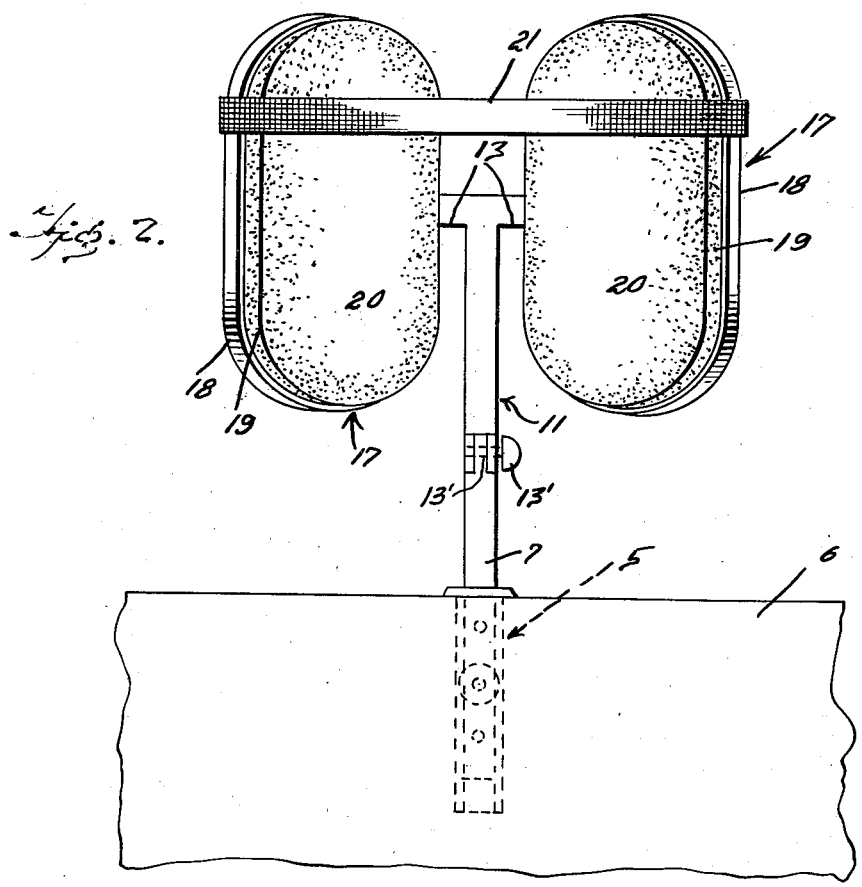
Figure 2 is a front elevation illustrating the support and showing its connection with a back rest.
Figure 3:
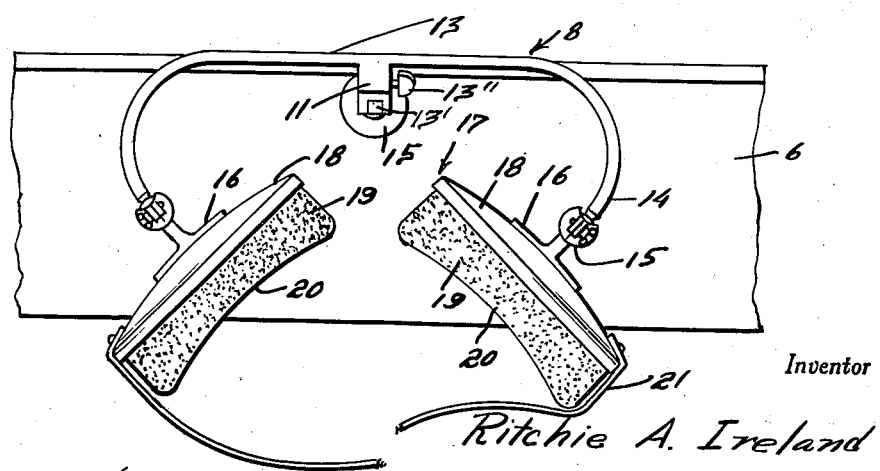
Figure 3 is a fragmentary top plan view showing the device.

Referring in detail to the drawings, the numeral 5 indicates an attaching sleeve secured in any suitable way to a back rest 6 of a seat or chair of a vehicle. As shown in the drawings, the sleeve may be substantially embedded in the upholstery of the back rest or may be secured on the exterior of the latter if so desired. The sleeve is for the purpose of removably receiving an upright 7 forming a part of a head rest 8. The upright 7 is provided with a series of openings 9, any one of which may receive a set screw 10 extending through the walls of the sleeve and having its finger piece conveniently arranged for manipulation. The set screw threads into one of the walls of the sleeve after passing through the upright. This construction will permit adjustment of the head rest 8 upwardly and downwardly, and also will permit the complete detachment of the head rest from the back of the seat for storage purposes when desired.

A substantially T-shaped spring member 11 including a leg portion 12 and arms portions 13 is pivotally and detachably connected to the upright 7. The pivotal detachable connection is indicated by the character 13' between the substantially T-shaped member and the upright and is of a type that will permit the T-shaped member to be adjusted forwardly and rearwardly with respect to the back of the seat or chair. Preferably said connection has the form of an adjustable hinge adapted to be held against adjustment by a thumb screw 13". The arm portions 13 extend in opposite directions and include arcuately curved extremities 14 having connected thereto by adjustable ball and socket joints 15 attaching plates 16. Secured on the attaching plates are head rest elements 17, each including a backing plate 18 and a cushion or pillow portion 19 provided with a concaved face 20. The backing plate 18 is secured to the attaching plate in any well known manner. The adjustable ball and socket joints 15 will permit the head rest elements 17 to be adjusted at different angular positions with respect to each other so that the concaved faces of the pillow or cushion elements 20 may be arranged to comfortably receive the heads of different individuals.

Connected to the head cushion or pillow elements 19 is an elastic strip 21 which may be brought over the forehead of a person's head for comfortably retaining a person's head in engagement with the cushion or pillow elements 19 relieving the person of any effort of keeping the head in contact therewith.

In use the device when applied to the back rest as clearly shown in Figure 1 may be easily and quickly adjusted to meet the needs of different individuals and with the head of the person resting thereon and held in engagement with the pillow or cushion elements the person may comfortably relax to relieve fatigue and also the device will prevent the head from being suddenly jerked in case of an accident or sudden stopping of the vehicle which might subject the person to injury of the neck or other parts of the anatomy.

It is to be understood that the device may be quickly removed and stored in a comparatively small space when not needed or desired.

While I have shown and described the preferred embodiment of my invention, it is to be understood that minor changes in construction, combination and arrangement of parts may be made without departing from the spirit and scope of the invention as claimed.

Having thus described my invention, what I claim is:

1. In a head support, an upright, means for detachably and adjustably securing said upright to the back of a seat, a substantially T-shaped spring member including a leg portion and arm portions and having the leg portion pivotally and detachably connected to the upright, said arm portions extending in opposite directions and including arcuately curved extremities, and head engaging elements adjustably connected to the extremities of the arm portions.

2. In a head support, an upright, means for detachably and adjustably securing said upright to the back of a seat, a substantially T-shaped spring member including a leg portion and arm portions and having the leg portion pivotally and detachably connected to the upright, said arm portions extending in opposite directions and including arcuately curved extremities, cushioned head engaging elements adjustably connected to the extremities of the arm portions and capable of being adjusted relative to each other and sustained in their adjusted positions.

3. In a head support, an upright, means for detachably and adjustably securing said upright to the back of a seat, a substantially T-shaped spring member including a leg portion and arm portions and having the leg portion pivotally and detachably connected to the upright, said arm portions extending in opposite directions and including arcuately curved extremities, cushioned head engaging elements adjustably connected to the extremities of the arm portions and capable of being adjusted relative to each other and sustained in their adjusted positions, and an elastic strip connecting the head engaging elements to be placed about a person's forehead to sustain the head in engagement with the head engaging elements.

RITCHIE A. IRELAND.